United States Patent

Davis

(10) Patent No.: US 7,483,240 B2
(45) Date of Patent: Jan. 27, 2009

(54) PIVOTABLE HEAD BRUSH ASSEMBLY FOR CLEANING READ/WRITE HEADS IN A MEDIA TAPE DRIVE

(75) Inventor: David Michael Davis, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/022,456

(22) Filed: Jan. 30, 2008

(65) Prior Publication Data

US 2008/0117547 A1    May 22, 2008

Related U.S. Application Data

(63) Continuation of application No. 10/229,199, filed on Aug. 27, 2002, now Pat. No. 7,330,337.

(51) Int. Cl.
*G11B 15/60* (2006.01)
(52) U.S. Cl. ................................. 360/130.21
(58) Field of Classification Search ............ 360/130.21, 360/128, 137
See application file for complete search history.

(56) References Cited

U.S. PATENT DOCUMENTS

| | | | |
|---|---|---|---|
| 6,333,831 B1* | 12/2001 | Todd | 360/128 |
| 2003/0151853 A1* | 8/2003 | Fahimi et al. | 360/137 |
| 2004/0042120 A1* | 3/2004 | Davis | 360/128 |
| 2004/0169960 A1* | 9/2004 | Hoelsaeter et al. | 360/128 |

* cited by examiner

*Primary Examiner*—Allen T Cao
(74) *Attorney, Agent, or Firm*—Dillon & Yudell LLP (57) ABSTRACT

One embodiment of a threader assembly for a tape drive has a retractable head brush assembly that is articulated into and out of wiping contact with the tape head. The head brush assembly is integrated into the cartridge loading assembly such that some of the same components used to load and unload the media tape also articulate the head brush assembly. In one version, the head brush assembly comprises a set of bristles that are mounted to a pair of brush arms. The head brush assembly has a cleaning position wherein the bristles are pivoted to wipe across the air bearing surface of the tape head. When the head brush assembly is in the cleaning position, the tape head is cleaned through the movement of the brush relative to the head. The head brush assembly also has a spring-biased storage position wherein the entire head brush assembly is pivotally retracted away from the tape head.

13 Claims, 7 Drawing Sheets

PIVOTABLE HEAD BRUSH ASSEMBLY FOR CLEANING READ/WRITE HEADS IN A MEDIA TAPE DRIVE

CROSS-REFERENCE TO RELATED APPLICATIONS

The present application is a continuation of U.S. patent application Ser. No. 10/229,199, filed on Aug. 27, 2002, and entitled "Pivotable Head Brush Assembly for cleaning Read/Write Heads in a Media Tape Drive," now U.S. Pat. No. 7,330,337,which is assigned to the assignee of the present invention and incorporated herein by reference in its entirety.

BACKGROUND OF THE INVENTION

1. Technical Field

The present invention relates in general to an improved data storage and retrieval device, and in particular to a mechanically-integrated head brush design for cleaning the read/write head in a media tape drive for improved performance in a data storage and retrieval device.

2. Description of the Prior Art

Data recording devices, such as data tape drives, record information to and read information from media, such as the data tape of a tape cartridge. Data tape drives typically are used in conjunction with, for example, a data storage and retrieval system such as a robotic library, wherein removable media cartridges are selectively transported in an automated environment for the purpose of input/output (I/O)

As the performance requirements of tape drives has continued to increase, the tape heads used to read data from and write data to the tape have become more sensitive to the environment in which they operate. Consequently, even slight amounts of contamination in a tape drive system can cause the tape heads to be susceptible to decreased performance or damage. One source of contamination in tape drives is the debris that is generated and accumulates due to the motion of the media tape relative to the tape drive components. Such debris is particularly problematic when it accumulates on the read/write heads of the tape drive. Tape heads have become even more susceptible to debris as the written density of media tape has increased. Along with increased media tape density, miniaturization of components continues to be a priority. Moreover, tape heads must be reliably maintained for repeatable operation. Thus, tape heads must be cleaned on a regular basis to overcome the problems associated with residual debris.

In the prior art, one solution to this problem is to employ a brush to periodically clean the heads. The current level of tape head sensitivity to debris and the performance requirements of the data themselves, essentially forces the tape heads to be cleaned on a very consistent basis. The head is typically cleaned or "swept" one time per tape load or unload. For example, one type of prior art device utilizes a brush that performs a linear sweep on the head. "Linear sweep" refers to sweeping the head in a longitudinal direction of the head (i.e., perpendicular to the tape path). See, e.g., U.S. Pat. No. 6,252, 739 to Todd, and U.S. Pat. No. 5,793,580 to Argumedo. Alternatively, a head brush can be held stationary against the tape head while the head dithers in a direction perpendicular to the tape path to accomplish the same objective. Still another prior art devices utilize cartridges of cleaning tape that are run through the tape drive to clean the tape heads. Examples of these devices are found in U.S. Pat. No. 6,215, 618 to Anderson, and in U.S. Pat. No. 5,859,755 to Griffin. Although each of these designs are workable, an improved head brush design for cleaning tape heads in a data storage and retrieval system would be desirable.

SUMMARY OF THE INVENTION

One embodiment of a threader assembly for a tape drive has a retractable head brush assembly that is articulated into and out of wiping contact with the tape head. The head brush assembly is integrated into the cartridge loading assembly such that some of the same components used to load and unload the media tape also articulate the head brush assembly. In one version, the head brush assembly comprises a set of bristles that are mounted to a pair of brush arms. The head brush assembly has a cleaning position wherein the bristles are pivoted to wipe across the air bearing surface of the tape head. When the head brush assembly is in the cleaning position, the tape head is cleaned through the movement of the brush relative to the head. The head brush assembly also has a spring-biased storage position wherein the entire head brush assembly is pivotally retracted away from the tape head.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features and advantages of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and therefore are not to be considered limiting of its scope as the invention may admit to other equally effective embodiments.

DETAILED DESCRIPTION OF THE PRESENT INVENTION

Figure 1:
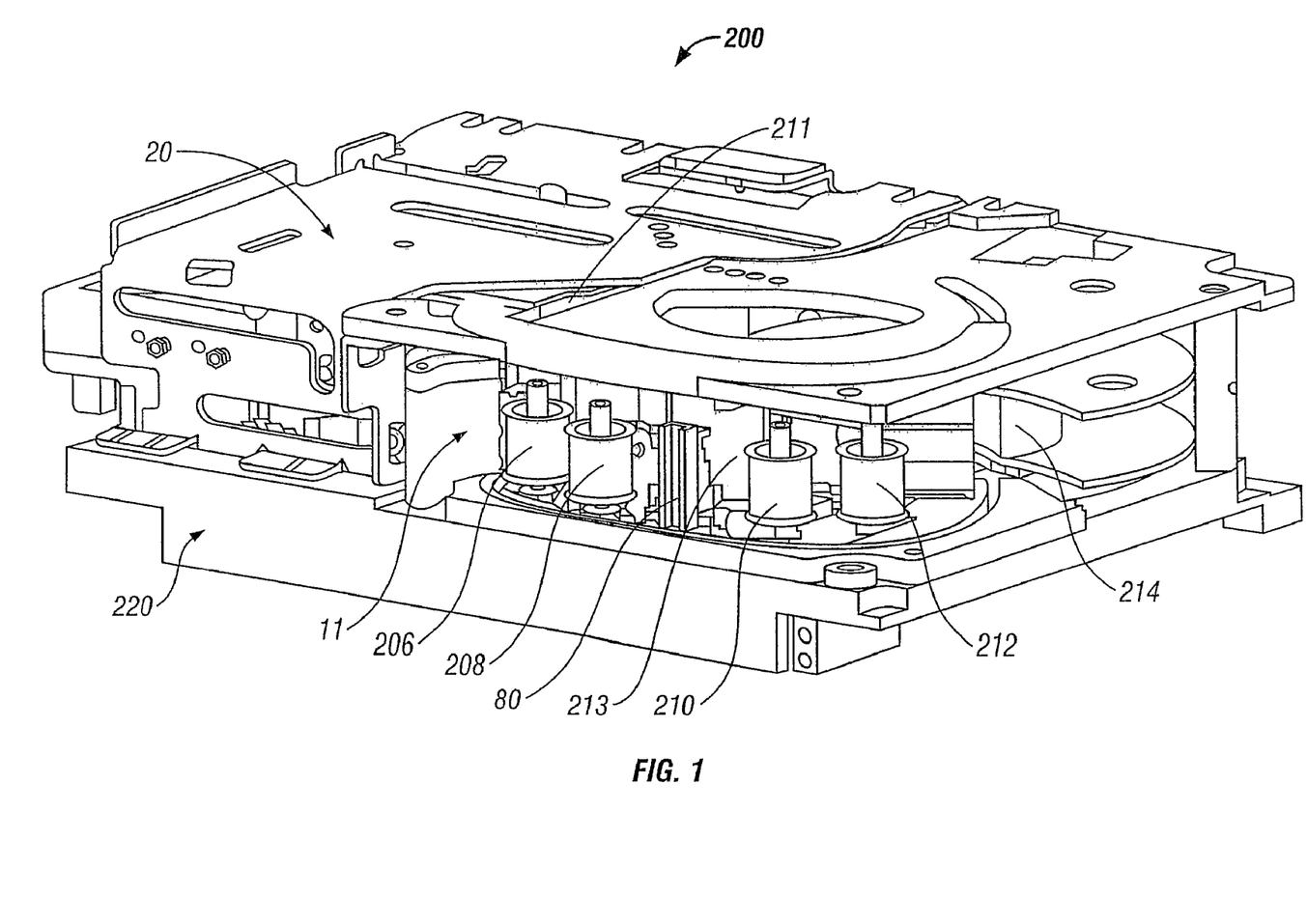
FIG. 1 is an isometric view of one embodiment of a media tape drive constructed in accordance with the present invention.
Figure 2:
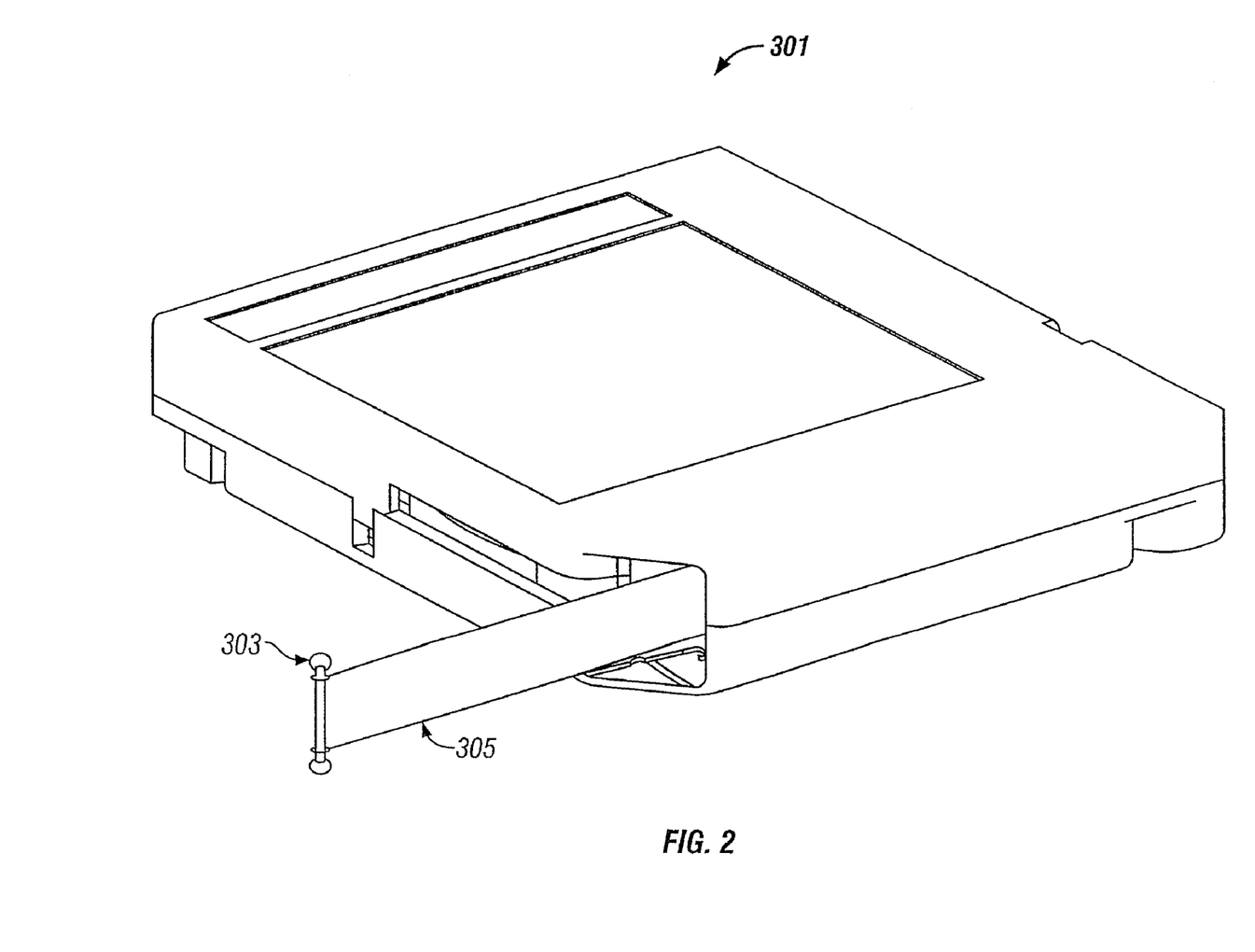
FIG. 2 is an isometric view of a removable media tape cartridge used in conjunction with the tape drive of FIG. 1.

Referring to FIG. 1, a reel-to-reel media tape drive 200 is shown with some components removed for clarification. Tape drive device 200 is usually located inside of a robotic library (not shown). Tape drive 200 may be any one of, for example, a family of tape drives using a single-reel tape cartridge, such as the IBM 3480, IBM 3490, IBM 3590, and Linear Tape Open (LTO) tape drives. Tape drive 200 has a cartridge loader 20 for receiving a single-reel tape cartridge 301 (see FIG. 2). Tape drive 200 also has a threader assembly 11 for threading and unthreading a media tape 305 of cartridge 301 around the tape guide rollers 206, 208, 210, 212, and into the take-up reel 214. One end of media tape 305 is provided with a leader pin 303 to facilitate these processes. Tape guide rollers 208 and 210 support the tape 305 as it flies over a magnetic tape transducer head 80 for reading data from and writing data to tape 305 in response to a control processor 213. Each of the components of tape drive 200 is mounted to a structural support frame 220. Tape drive device 200 is typically mounted within a device enclosure (not shown) in order to protect the tape drive device 200 from dust and debris, as well as extraneous air currents that could disturb the way the magnetic tape passes over the magnetic head 80.

Figure 3:
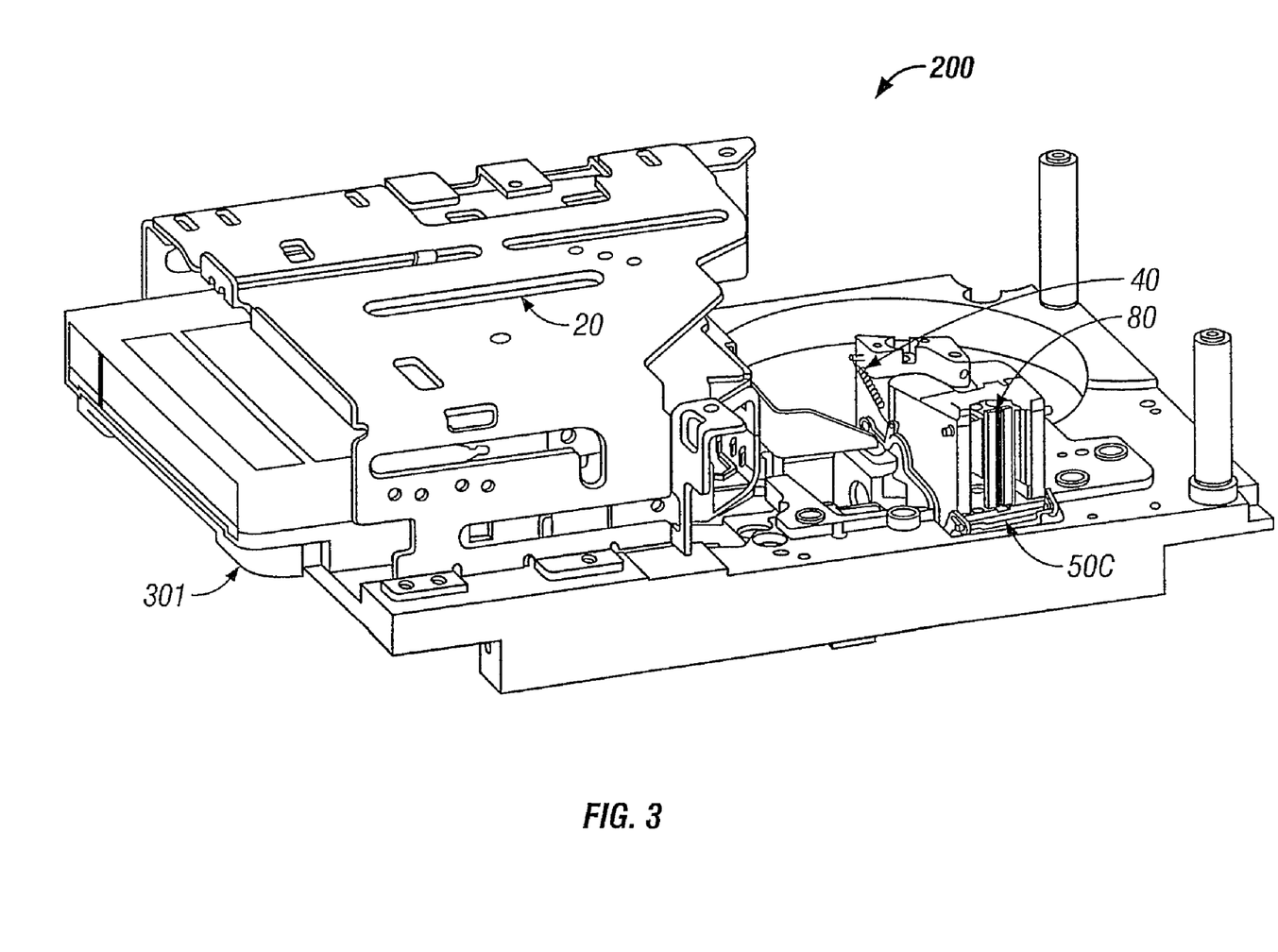
FIG. 3 is an isometric view of a portion of the tape drive of FIG. 1, illustrating a head brush assembly constructed in accordance with the present invention.
Figure 4:
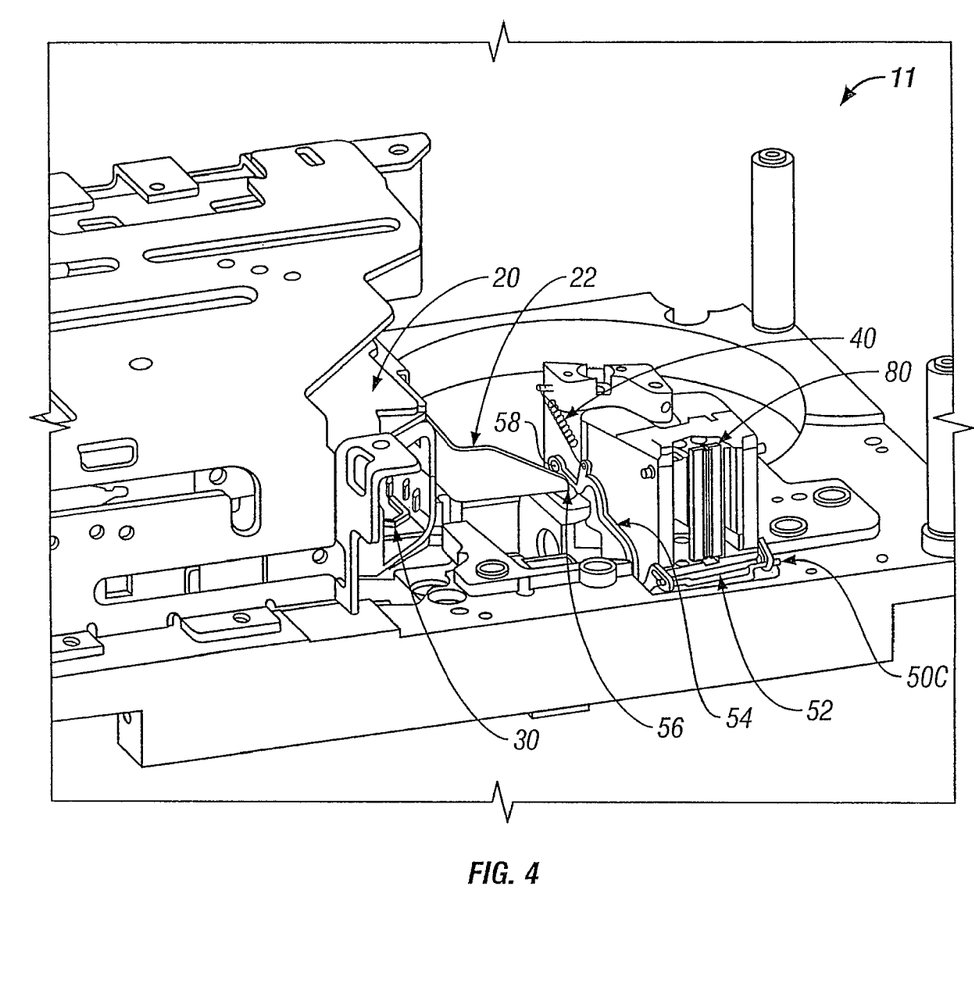
FIGS. 4-7 are enlarged isometric views of the tape drive of FIG. 1 showing various positions of the head brush assembly and other elements of FIG. 3.
Figure 5:
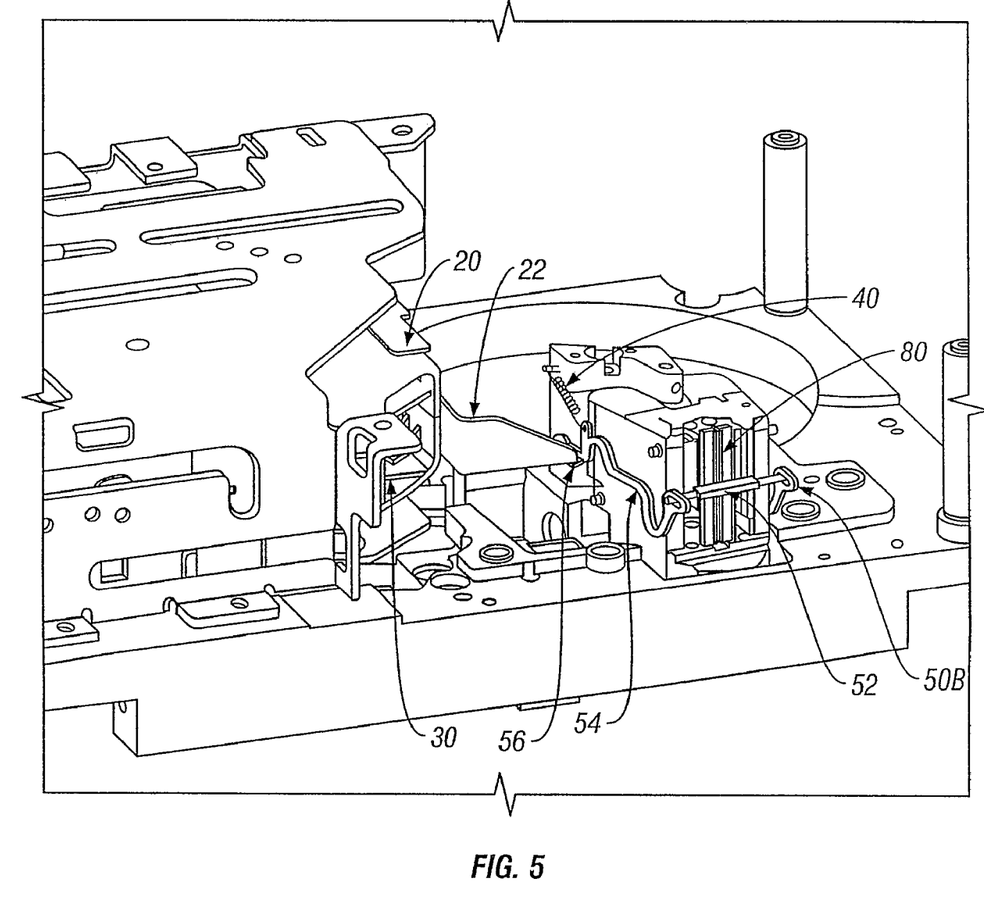

Referring now to FIGS. 3-7, a portion of one embodiment of threader assembly 11 is shown. Threader assembly 11 is provided with a head brush assembly 50, which is one subject of the present invention. To illustrate its range of motion and for ease of understanding, head brush assembly 50 is illustrated in three different pivotal positions, which are enumerated as 50A (FIGS. 6 and 7), 50B (FIG. 5), and 50C (FIGS. 3 and 4). Thus, head brush assembly 50 does not comprise three separate brushes; rather, numerals 50A-C represent a few positions in the range of motion of head brush assembly 50. In all three positions 50A-C, a brush 52 of head brush assembly 50 is oriented in a direction that is transverse to a longitudinal (length-wise) direction of head 80, which is parallel to a direction of travel of tape 305.

Figure 6:
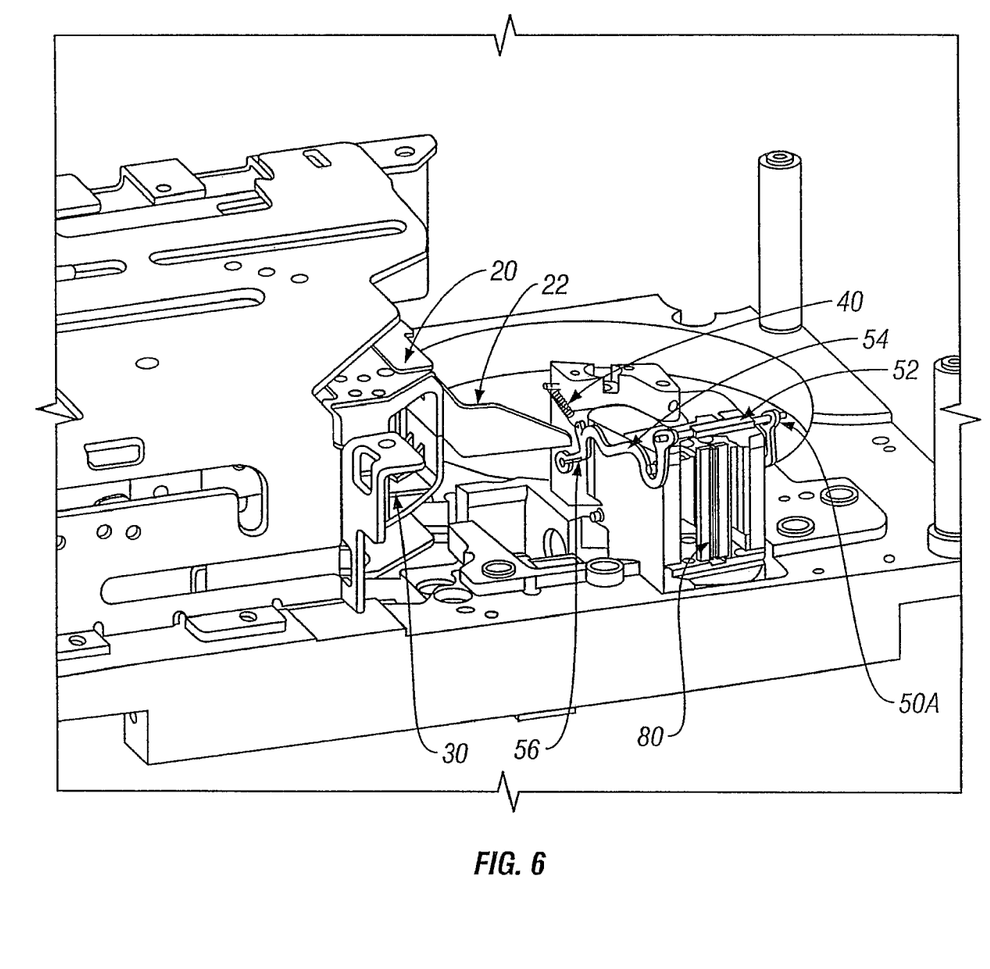
Figure 7:
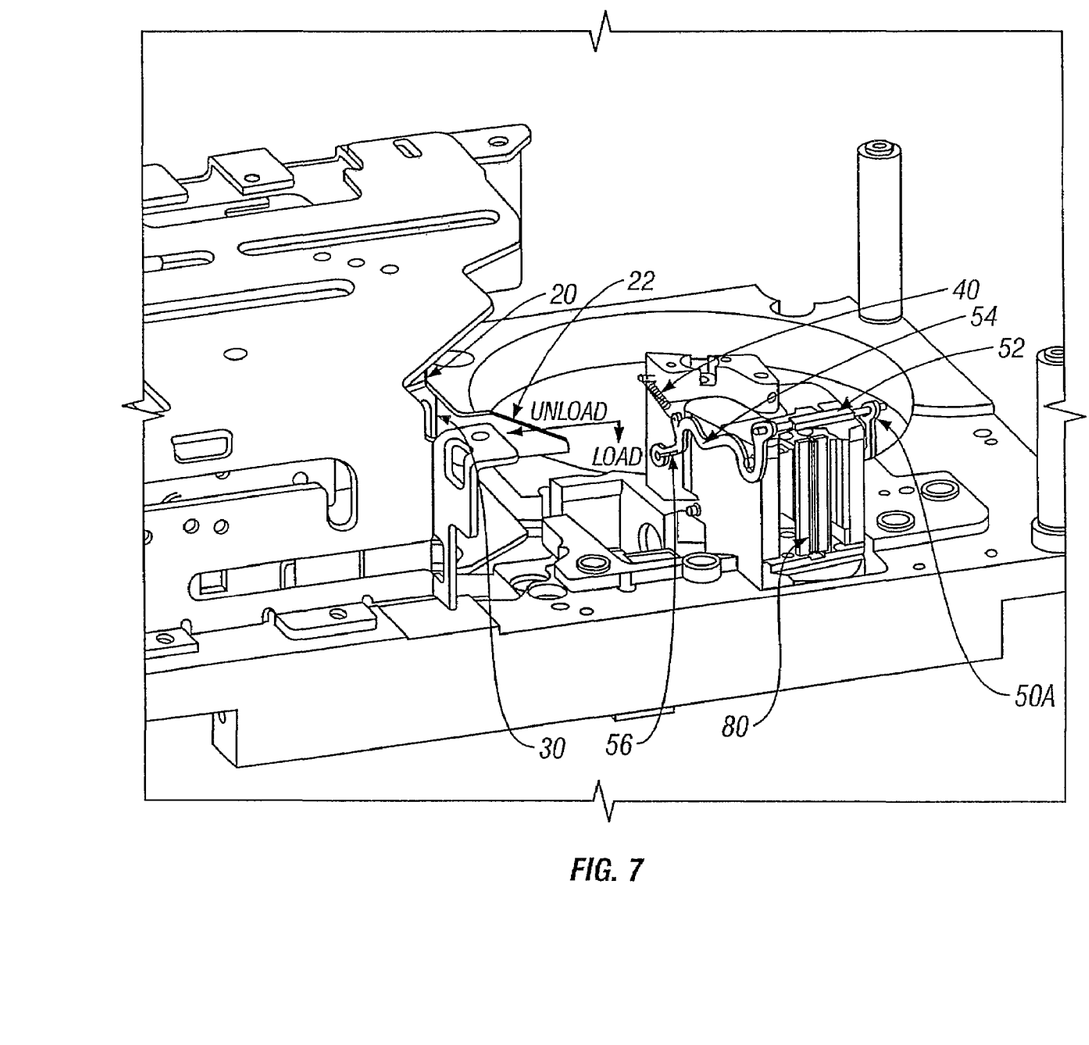

Head brush assembly 50 has a horseshoe-like shape that straddles the magnetic read/write head 80 or HAA (head actuator assembly). The closed end of the head brush assembly 50 supports brush 52 (FIG. 4) and is located adjacent to the outer or air bearing surface (ABS) of the head 80. Brush 52 rides in a compliant mount with respect to the two frame-like arms 54 of head brush assembly 50 so that it stays in brushing contact with the entire air bearing surface of head 80 as it sweeps between positions 50A and 50C. In the embodiment shown, arms 54 include pivot mounts 58 that couple head brush assembly 50 to the underlying frame 220 on each side of head 80 about a vertical center line thereof. Thus, the open end of head brush assembly 50 straddles the overall head assembly that supports head 80. The head brush assembly 50 is biased upward by a spring 40 to its upper position 50A (FIGS. 6 and 7). In position 50A, head brush assembly 50 is parked above head 80 to allow over travel of the brush 52 over the entire ABS of head 80 for cleaning.

Actuation of the head brush assembly 50 in the downward direction is accomplished by the translation of a tape cartridge 301 in a loader mechanism 20. The loader mechanism 20 is actuated by a motor 211 (FIG. 1) to take the cartridge 301 from a set pick up/put back position and loads it into the drive 200. The loading motion includes a horizontal translation of cartridge 301 into drive 200, and a vertical translation (lowering) that includes putting the cartridge 301 in contact with a chucking mechanism (not shown). The vertical translation of the loader mechanism 20 is one device by which head brush assembly 50 may be articulated through its vertical range of motion.

On a part of the loader mechanism 20 that lowers the tape cartridge 301 to the deck for reel mating with the motor chuck, an appendage 22 is affixed for the actuation of the head brush 50. On one of the arms 54 on the head brush assembly 50, there is a designated "landing pad" 56 (FIGS. 5 and 6) for engaging the appendage 22 extending from the loader mechanism 20. Appendage 22 is the mechanism by which head brush assembly 50 is mechanically engaged and actuated from position 50A to position 50C. It is the return spring 40 that biases and moves head brush assembly 50 from position 50C to position 50A.

In the tape loading and head cleaning cycle, the tape cartridge 301 loads and thereby moves the appendage 22 down to contact pad 56 on the head brush assembly 50 at position 50A. The contact and sustaining vertical translation force supplied by appendage 22 in the downward direction smoothly advances the head brush assembly 50 through position 50B before coming to rest at position 50C. Thus, the downward translation of appendage 22 is sufficient to overcome the biasing force or resistance of spring 40, which urges head brush assembly to position 50A. The downward travel of the head brush assembly 50 sweeps the brush 52 from position 50A, which is located above the ABS of head 80, to position 50C, which is located below the ABS of head 80. The brush 52 continues its sweeping action until it sweeps the length of the ABS on head 80 in the longitudinal direction and over travels off the end of the head 80 into the "run" position 50C, which is hidden in the lower hardware at the bottom end of the head 80, and out of the interference path of any moving hardware. In the over travel of the head brush assembly 50 at the lower end of the head 80, the loader mechanism 20 ends its vertical translation of load and stops at position 50C. The drive 200 then threads and runs the tape 305 of cartridge 301. Thus, head brush assembly 50 does not contact head 80 in either position 50A or 50C (which are located on opposite sides of the head 80), but only during motion between these two positions.

When the drive 200 has completed usage of cartridge 301, it unthreads the tape 305 of cartridge 301 for removal from drive 200. Upon tape unthreading, drive 200 initiates an unload operation on the tape cartridge 301. The loader mechanism 20 starts a vertical translation in the upward direction to remove the tape reel engagement with the drive motor clutch. The loader appendage 22 lifts its impending load against pad 56 on the head brush assembly 50, and the brush assembly 50 starts rotating upwards as it is driven by the stored energy of the return spring 40. During this unload cycle, the brush 52 re-appears from the area below the lower end of the head 50C to contact and sweep the ABS of head 80 in the upward direction. Through continuation of the unload cycle, the brush 52 travels and sweeps the entire ABS of head 80, traveling past the end of the head 80 to park at position 50A, which is located above the upper vertical end of the head 80 at the end of the vertical translation of the loader mechanism 20. At the end of its vertical translation, appendage 22 on loader mechanism 20 disengages the pad 56 of the head brush assembly 50. The loader mechanism 20 finishes it's unload cycle with the horizontal translation of loader mechanism 20, thereby expelling the tape cartridge 301 to the pick/put interface.

The present invention has several advantages including the ability to significantly reduce the size and space required for a head cleaning assembly. A head brush utilized in a threader assembly and constructed in accordance with the present invention can be fully retracted away from the tape head. The head brush is efficiently integrated into the cartridge loading assembly such that the same components used to load and unload the media tape also articulate the head brush. In its storage position, the entire head brush assembly is pivotally retracted away from the tape head without interfering with other components of the threader assembly, thereby greatly reducing packaging volume requirements. In addition, the present invention is mechanically actuated and operated by the movement of pre-existing components of the tape drive, and therefore only requires a slight mechanical reconfiguration of the tape drive without modification of the existing electrical circuitry of the tape drive.

While the invention has been shown or described in only some of its forms, it should be apparent to those skilled in the art that it is not so limited, but is susceptible to various changes without departing from the scope of the invention.

What is claimed is:

1. A tape drive for processing a media tape wound on a tape cartridge, comprising:
   a structural support frame;
   a cartridge loader mounted to the structural support frame for receiving the tape cartridge;
   a threader assembly mounted to the structural support frame for conveying the media tape relative to the tape cartridge, and between the cartridge loader and the tape drive;
   a transducer head for reading data from and writing data to the media tape, wherein the transducer head is coupled to the structural support flame and has an air bearing surface; and
   a head brush assembly coupled to the structural support frame and mechanically linked and being responsive to the cartridge loader for movement between a first position and a second position, wherein the head brush assembly is actuated by the cartridge loader during media tape threading and unthreading processes, such that when the head brush assembly moves between the first and second positions, the head brush assembly contacts and sweeps the transducer head to clean debris from the air bearing surface of the transducer head.

2. The tape drive of claim 1, further comprising an appendage extending from the cartridge loader for engaging a portion of the head brash assembly and moving the head brush assembly from the first position to the second position, and wherein the head brush assembly moves from the second position to the first position when the appendage releases the head brush assembly.

3. The tape drive of claim 2, wherein the head brush assembly is spring-biased to move from the second position to the first position.

4. The tape drive of claim 1, wherein the head brush assembly comprises a pair of arms pivotally coupled to the structural support frame, and a brush having bristles mounted to the pair of arms such that the head brush assembly straddles the transducer head.

5. The tape drive of claim 1, wherein the transducer head defines a longitudinal direction that is transverse to a direction of travel of the media tape, such that a brash of the head brush assembly is transverse to the longitudinal direction through a range of travel of the head brush assembly.

6. The tape drive of claim 5, wherein the brush of the head brush assembly is compliantly mounted thereto to maintain sweeping contact between the brush and the transducer head throughout the range of travel of the head brush assembly.

7. The tape drive of claim 1, wherein the first and second positions are located on opposite sides of the transducer head, and wherein the head brush assembly is free of contact with the transducer head in both the first and second positions, and only makes contact with the transducer head as the head brush assembly moves between the first and second positions.

8. A tape drive for processing a media tape wound on a tape cartridge, comprising:
   a structural support frame;
   a cartridge loader mounted to the structural support frame for receiving the tape cartridge and having an appendage extending therefrom;
   a threader assembly mounted to the structural support frame for conveying the media tape relative to the tape cartridge, and between the cartridge loader and the tape drive;
   a transducer head for reading data from and writing data to the media tape, wherein the transducer head is coupled to the structural support frame and has an air beating surface;
   a head brush assembly coupled to the structural support frame and mechanically linked and being responsive to the appendage of the cartridge loader for movement from a first position to a second position, wherein the head brush assembly is biased to return to the first position from the second position when the appendage releases the head brush assembly; and wherein
   the head brush assembly contacts and sweeps the transducer head to clean debris from the air bearing surface of the transducer head when it moves between the first and second positions.

9. The tape drive of claim 8, wherein the appendage of the cartridge loader actuates the head brush assembly during media tape threading and unthreading processes.

10. The tape drive of claim 8, wherein the head brush assembly comprises a pair of arms pivotally coupled to the structural support frame, and a brush having bristles mounted to the pair of arms adjacent to the transducer head such that the head brush assembly straddles the transducer head.

11. The tape drive of claim 8, wherein the transducer head defines a longitudinal direction that is transverse to a direction of travel of the media tape, such that a brush of the head brush assembly is transverse to the longitudinal direction through a range of travel of the head brush assembly.

12. The tape drive of claim 11, wherein the brush of the head brush assembly is compliantly mounted thereto to maintain sweeping contact between the brush and the transducer head throughout the range of travel of the head brush assembly.

13. The tape drive of claim 8, wherein the first and second positions are located on opposite sides of the transducer head, and wherein the head brush assembly is free of contact with the transducer head in both the first and second positions, and only makes contact with the transducer head as the head brush assembly moves between the first and second positions.

* * * * *